(No Model.)

L. C. TERRY.
COTTON BALE HEADER.

No. 282,801. Patented Aug. 7, 1883.

WITNESSES:
Donn Twitchell
C. Sedgwick

INVENTOR:
L. C. Terry
BY Munn & Co
ATTORNEYS.

UNITED STATES PATENT OFFICE.

LOUIS C. TERRY, OF COLUMBUS, MISSISSIPPI.

COTTON-BALE HEADER.

SPECIFICATION forming part of Letters Patent No. 282,801, dated August 7, 1883.

Application filed June 23, 1883. (No model.)

*To all whom it may concern:*

Be it known that I, LOUIS CLARK TERRY, of Columbus, in the county of Lowndes and State of Mississippi, have invented a new and Improved Cotton-Bale Header, of which the following is a full, clear, and exact description.

My invention consists of a contrivance for setting up compressed cotton-bales on the end or side as they come from the compress, to facilitate the loading of them on the trucks to be carted away, the said contrivance being a platform arranged in the floor like a trap-door, and being connected with a lever located under the floor, and arranged in such relation to the lower platen of the press that when the press opens for the reception of a bale to be compressed the said platen will depress the lever and cause it to swing up the platform with the previously-compressed bale on it, setting the same on edge or end, as the case may be, and thereby doing the work for which two men are now commonly employed, all as hereinafter fully described.

Reference is to be had to the accompanying drawings, forming a part of this specification, in which similar letters of reference indicate corresponding parts in both the figures.

Figure 1:
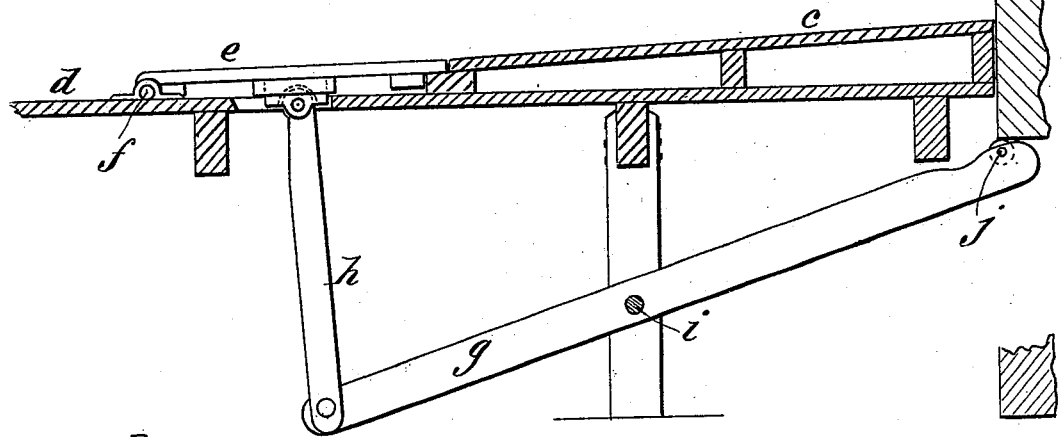
Figure 2:
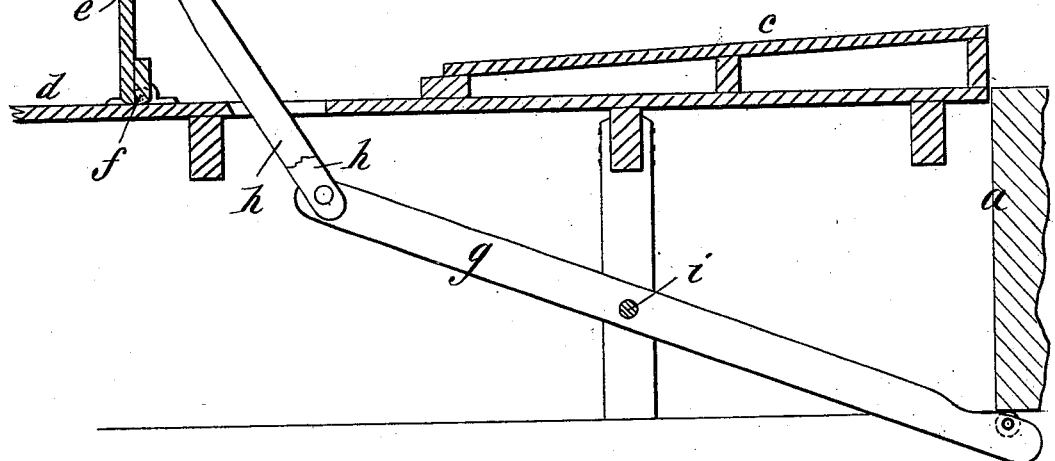

Figure 1 is a sectional elevation of a portion of the floor whereon the compressed bales are discharged from the press, also some portions of the platens of the press, showing the contrivance of my apparatus for setting up the bales, which I call a "cotton-bale header," the platform being in this case in the position for placing a bale on it for being tilted up. Fig. 2 is a similar section, showing the platform raised upon end, as when having tilted up a bale.

The device *a* is intended to represent a portion of the lower platen of a compress, and *b* a portion of the upper platen, between which the bales are to be compressed with great force by the aid of steam or hydraulic machinery—as, for instance, in the "Morse" compress. *c* represents the slightly-sloping floor, onto which the compressed bales are discharged from the press, to be moved along to the place *d*, where they are to be set up endwise for being loaded on the trucks. For utilizing the power of the press to thus set up the bales, I propose to arrange a short section, *e*, of said sloping floor *c* just back of the place *d* on hinges at *f*, connecting the under side with the lever *g* by a couple of bars, *h*, the said lever being pivoted at *i*, and extended along under floor *c* to where the lower end of platen *a* will thrust said lever down when the platen descends and the press opens for a new bale, as represented in Fig. 2, and thereby swing platform *e* up with the bale on it, to set the said bale up suitably for loading on the truck. When the platen *a* ascends, the platform *e* falls back to its place, ready for the next bale, which is to be slid onto it from floor *c*, ready for being raised up by the next opening of the press.

In this case I have represented the lifting-platform *e* as being located directly in front of the platen of the press; but it is obvious that said platform may be set to the right or left hand, or in any preferred direction therefrom, and the platform may be pivoted so as to end up the bale to the right or left, instead of directly from the press, as shown in the drawings.

The lever *g* has a friction-roller, *j*, arranged in the end, whereon the platen works to facilitate the working of said lever by the platen.

Having thus described my invention, I claim as new and desire to secure by Letters Patent—

1. A tilting platform, *e*, arranged in the floor *c* of a compress, whereon the bales are discharged from the press and having a lever connected with it, and arranged with relation to the platen of the press as described, for the purpose of setting up the bales on edge or end, substantially as specified.

2. The combination of hinged platform *e*, bars *h*, lever *g*, and the platen *a* of a compress, substantially as shown and described.

LOUIS CLARK TERRY.

Witnesses:
   A. C. LEE,
   G. M. COX.